(12) United States Patent
Fujii et al.

(10) Patent No.: US 8,310,621 B2
(45) Date of Patent: Nov. 13, 2012

(54) ILLUMINATION DEVICE AND LIQUID CRYSTAL DISPLAY DEVICE

(75) Inventors: Akiyoshi Fujii, Osaka (JP); Kyohko Azumada, Osaka (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 184 days.

(21) Appl. No.: 12/867,602

(22) PCT Filed: Feb. 10, 2009

(86) PCT No.: PCT/JP2009/000533
§ 371 (c)(1),
(2), (4) Date: Aug. 13, 2010

(87) PCT Pub. No.: WO2009/101797
PCT Pub. Date: Aug. 20, 2009

(65) Prior Publication Data
US 2010/0321611 A1    Dec. 23, 2010

(30) Foreign Application Priority Data
Feb. 13, 2008   (JP) .................. 2008-031941

(51) Int. Cl.
*G02F 1/13357*   (2006.01)
(52) U.S. Cl. ........................................... 349/61
(58) Field of Classification Search .................. None
See application file for complete search history.

(56) References Cited

U.S. PATENT DOCUMENTS

| | | | |
|---|---|---|---|
| 5,506,704 A | 4/1996 | Broer et al. | |
| 5,828,488 A | 10/1998 | Ouderkirk et al. | |
| 6,724,446 B2 | 4/2004 | Motomura et al. | |
| 6,897,926 B2 | 5/2005 | Mi et al. | |
| 7,106,507 B2 | 9/2006 | Lee et al. | |
| 2004/0174596 A1 | 9/2004 | Umeki | |
| 2006/0039069 A1 | 2/2006 | Hayashi et al. | |
| 2006/0055838 A1* | 3/2006 | Mi et al. ................... | 349/30 |
| 2006/0098140 A1 | 5/2006 | Lee | |
| 2010/0321611 A1 | 12/2010 | Fujii et al. | |

FOREIGN PATENT DOCUMENTS

JP   9-160013   6/1997
(Continued)

OTHER PUBLICATIONS

International Search Report for PCT/JP2009/000533, mailed Apr. 14, 2009.
English translation of the International Preliminary Report, dated Sep. 16, 2010 in corresponding PCT application PCT/JP2009/000533.
International Search Report for PCT/JP2009/003854, mailed Oct. 6, 2009.

(Continued)

*Primary Examiner* — Mike Stahl
(74) *Attorney, Agent, or Firm* — Nixon & Vanderhye, P.C.

(57) ABSTRACT

An illuminator according to the present invention includes a backlight (110) for emitting light containing first and second polarization components having polarization directions which are orthogonal to each other; and a selective reflection polarizer (120) having a reflectance for the first polarization component which is higher than a transmittance for the first polarization component, and having a transmittance for the second polarization component which is higher than a reflectance for the second polarization component. The selective reflection polarizer (120) includes a transparent substrate (122) and a plurality of metal wires (124) arrayed on the transparent substrate (122). The ratio of a width of the metal wires (124) to a pitch of the metal wires (124) is greater than 30% and equal to or less than 42%, and the backlight (110) has a reflectance of 0.6 or more.

5 Claims, 8 Drawing Sheets

FOREIGN PATENT DOCUMENTS

| | | |
|---|---|---|
| JP | 2006-47829 | 2/2006 |
| JP | 2007-3787 | 1/2007 |
| JP | 2007-171245 | 7/2007 |
| JP | 2007-171802 | 7/2007 |

OTHER PUBLICATIONS

U.S. Appl. No. 13/059,525, filed Feb. 17, 2011, entitled "Liquid Crystal Display Device".

* cited by examiner (a)

(b)

(a)

(b)

(a)

(b)

(a)

(b)

ILLUMINATION DEVICE AND LIQUID CRYSTAL DISPLAY DEVICE

This application is the U.S. national phase of International Application No. PCT/JP2009/000533 filed 10 Feb. 2009, which designated the U.S. and claims priority to JP Application No. 2008-031941 filed 13 Feb. 2008, the entire contents of each of which are hereby incorporated by reference.

TECHNICAL FIELD

The present invention relates to an illuminator and a liquid crystal display device.

BACKGROUND ART

A liquid crystal display device has advantages such as light weight, thinness, and low power consumption.

Therefore, liquid crystal display devices are being utilized for the display sections of television sets, computers, mobile terminals, and the like. Unlike a cathode ray tube (CRT) or a self-light-emitting type panel such as a plasma display panel (PDP), a liquid crystal panel of a liquid crystal display device does not emit light by itself. Therefore, in a transmission-type liquid crystal display device and a transmission/reflection combination type liquid crystal display device, a backlight is provided on the rear face of the liquid crystal panel, and displaying is performed with light which goes out from the backlight and travels through the liquid crystal panel.

Light which is emitted from the backlight is non-polarized light. In a transmission-type liquid crystal display device and a transmission/reflection combination type liquid crystal display device, polarizers are provided so as to sandwich the liquid crystal layer. The polarizers transmit a polarization component having a polarization direction which is parallel to the transmission axis, and absorb a polarization component having a polarization direction which is orthogonal to the transmission axis. Therefore, out of the light which goes out from the backlight, it is substantially a half that is transmitted through the polarizer which is closer to the backlight, and substantially a half of the light from the backlight is not utilized.

Therefore, use of a selective reflection polarizer for increasing the efficiency of light utilization is known. A selective reflection polarizer transmits one of two polarization components whose polarization directions are orthogonal to each other, and reflects the other. A selective reflection polarizer is disposed on an outgoing face of an illuminator having a backlight, for example. A selective reflection polarizer transmits most of the polarization component whose polarization direction is parallel to the transmission axis, but allows most of the polarization component that would be absorbed by a traditional polarizer to be reflected toward the backlight. A portion of the light having returned to the backlight is reflected at the backlight and changes its polarization state, and again exits the outgoing face of the backlight toward the selective reflection polarizer. A portion of the light exiting the outgoing face of the backlight is transmitted through the selective reflection polarizer. Thus, by providing a selective reflection polarizer, the efficiency of light utilization is increased, so that the luminance of the liquid crystal display device is increased 1.2 to 1.4 folds.

Selective reflection polarizers are classified into three types. A first type of selective reflection polarizer is made of a dielectric multilayer film (see, for example, Patent Document 1). This type of selective reflection polarizer has a structure (dielectric multilayer structure) such that multiple layers of a material having refractive index anisotropy within its plane and an isotropic material are stacked, and is also referred to as a dielectric multilayer film.

A second type uses a birefringent material such as liquid crystal (see Patent Document 2). This type of selective reflection polarizer is formed by orienting a mesomorphic material within the plane.

A third type includes a plurality of metal wires arrayed on a transparent substrate. The metal wires are made of a metal having a high reflectance. This type of selective reflection polarizer is also referred to as a wire grid. Through patterning of a thin metal film, the plurality of metal wires are arrayed in parallel, with a pitch which is equal to or less than the wavelength of light of interest.

These selective reflection polarizers basically have similar functions, but have their own characteristic features. In the first type of selective reflection polarizer, as in a dielectric mirror, transmission and reflection of polarized light occurs based on a refractive index difference between layers which is caused by refractive index anisotropy. For example, light is transmitted when the difference between the refractive indices of two adjoining layers in a direction which is perpendicular to the incident face is zero, whereas light is reflected at the boundary between the two layers when the difference between the refractive indices of the two adjoining layers in a direction parallel to the incident face is large, and as a result of this, selective reflection occurs. Therefore, the first type of selective reflection polarizer has a high transmittance and reflectance. However, wavelength dispersion may occur because the wavelength that is optimum for transmission and reflection is determined based on the thickness of each layer of the dielectric multilayer structure and there is a large wavelength dependence in the transmission and reflection. Therefore, in order to obtain a desired performance across the entire range of visible light, it is necessary to form a dielectric multilayer film of about 200 layers that is optimum for each of R, G, and B wavelengths of the light source of the backlight, and attach these together. In this case, fabrication is not easy, and also the attached layers will be as thick as about 150 µm. Moreover, the degree of polarization of a selective reflection polarizer is determined based on variations in the thicknesses, refractive indices and anisotropy of the respective layers, and is generally about 90%.

The second type of selective reflection polarizer utilizes a birefringent material, and therefore has a simpler structure than that of a dielectric multilayer film and is easy to produce. However, since transmission and reflection occurs in a birefringent layer, there is a large wavelength dependence and wavelength dispersion occurs, so that light from a direction which is oblique with respect to the normal direction of the principal face of the selective reflection polarizer may become tinted. As the birefringent material of the second type of selective reflection polarizer, a liquid crystal material whose orientation direction is easy to control is suitably used. In this case, a cholesteric liquid crystal is often used, whose thickness is similar to that of a liquid crystal layer of a liquid crystal panel, i.e., about to about 6 µm. The degree of polarization of this selective reflection polarizer also cannot be high, and will be similar to that of the first type of selective reflection polarizer.

With the third type of selective reflection polarizer, wavelength dispersion in the visible light region can be suppressed by setting the pitch of the metal wires to about ½ or less of 400 nm of blue, which is shorter in wavelength in the visible light region. Moreover, its characteristics are determined by the metal wires obtained through patterning a single layer of thin metal film, and it can be made thinner than the aforementioned two types, to about 0.1 μm. Furthermore, the degree of polarization of this type of polarizer depends on the spaces between the metal wires and the pitch of the metal wires; for example, if the metal wire pitch is 150 nm and the metal wire width is 75 nm, the degree of polarization is 99.9% or more, thus realizing a high degree of polarization.

In recent years, application purposes of liquid crystal display devices are being broadened, and stable operation is required even in places of high temperatures of use, e.g., an onboard display device. Moreover, for an improved image quality, improvements in the resolution and luminance of a liquid crystal display device are being required, and therefore an increased driver frequency based on a more rapid image signal processing within the liquid crystal display device and a high output power of the light sources of its backlight are required, and the temperature during use tends to increase.

On the other hand, from the standpoint of design and compactness of the liquid crystal display device, thinning of the liquid crystal display device is being required. This calls for thinner members to be used in the liquid crystal display device. For example, as a transparent substrate, a glass substrate with a thickness of about 0.2 mm, or a plastic substrate with a thickness of about 0.1 mm is used. Moreover, designing is carried out to make the optical films used in a liquid crystal display device thinner by every 10 microns.

In order to realize such a liquid crystal display device, a selective reflection polarizer which is thin and which has an excellent thermal resistance is being required. The first type needs a large number of layers to be stacked, and the second type of selective reflection polarizer is formed by sandwiching a liquid crystal layer with two films or the like, whereas the third type of selective reflection polarizer (wire grid) comprises metal wires formed on one face of a transparent substrate, and therefore can be made thin and attain a high withstand temperature.

[Patent Document 1] Japanese National Phase PCT Laid-Open Publication No. 10-511322

[Patent Document 2] Japanese Laid-Open Patent Publication No. 6-281814

[Patent Document 3] Japanese Laid-Open Patent Publication No. 2006-47829

DISCLOSURE OF INVENTION

Problems to be Solved by the Invention

As described above, a wire grid is thin and has excellent thermal resistance. However, a wire grid includes metal wires made of a metal, and inevitably, light absorption by the metal occurs. Therefore, an illuminator including a wire grid may have a lower efficiency of light utilization than those of illuminators including other types of selective reflection polarizers.

The present invention has been made in view of the above problems, and an objective thereof is to provide an illuminator and a liquid crystal display device which are thin and realize a high withstand temperature, and which have a high efficiency of light utilization.

Means for Solving the Problems

An illuminator according to the present invention includes: a backlight for emitting light containing first and second polarization components having polarization directions which are orthogonal to each other; and a selective reflection polarizer having a reflectance for the first polarization component which is higher than a transmittance for the first polarization component, and having a transmittance for the second polarization component which is higher than a reflectance for the second polarization component, wherein, the selective reflection polarizer includes a transparent substrate and a plurality of metal wires arrayed on the transparent substrate; and a ratio of a width of the metal wires to a pitch of the metal wires is greater than 30% and equal to or less than 42%, and the backlight has a reflectance of 0.6 or more.

In one embodiment, the reflectance of the backlight is no less than 0.6 and no more than 0.8.

In one embodiment, the pitch of the metal wires is 200 nm or less.

In one embodiment, the metal wires have a thickness of substantially 100 nm.

A liquid crystal display device according to the present invention includes: a liquid crystal panel; a backlight for emitting light containing first and second polarization components having polarization directions which are orthogonal to each other; and a selective reflection polarizer interposed between the liquid crystal panel and the backlight, the selective reflection polarizer having a reflectance for the first polarization component which is higher than a transmittance for the first polarization component, and having a transmittance for the second polarization component which is higher than a reflectance for the second polarization component, wherein, the selective reflection polarizer includes a transparent substrate and a plurality of metal wires arrayed on the transparent substrate; and a ratio of a width of the metal wires to a pitch of the metal wires is greater than 30% and equal to or less than 42%, and the backlight has a reflectance of 0.6 or more.

Effects of the Invention

According to the present invention, an illuminator and a liquid crystal display device which are thin and realize a high withstand temperature, and which have a high efficiency of light utilization, can be provided.

Figure 1:
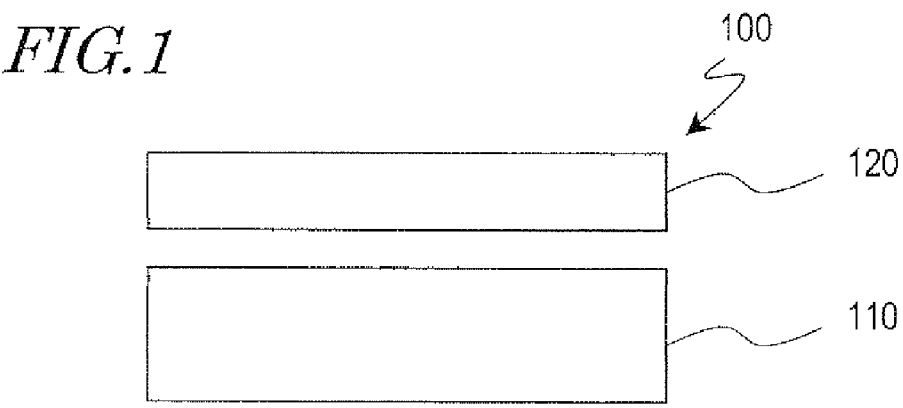
[FIG. 1] A schematic diagram showing an embodiment of an illuminator according to the present invention.

DESCRIPTION OF REFERENCE NUMERALS 100 illuminator
110 backlight
120 selective reflection polarizer
122 transparent substrate
124 metal wire
150 liquid crystal display device
200 liquid crystal panel

BEST MODE FOR CARRYING OUT THE INVENTION

Hereinafter, with reference to the drawings, an embodiment of an illuminator and a liquid crystal display device according to the present invention will be described. However, the present invention is not limited to the embodiment below.

FIG. 1 shows a schematic diagram of an embodiment of an illuminator according to the present invention. The illuminator 100 of the present embodiment includes a backlight 110 and a selective reflection polarizer 120. The selective reflection polarizer 120 has a transmission axis along which linearly polarized light in a certain direction is transmitted. The selective reflection polarizer 120 mainly transmits a polarization component of the light emitted from the backlight 110 that has a polarization direction which is parallel to the transmission axis, and mainly reflects a polarization component of the light emitted from the backlight 110 that has a polarization direction which is orthogonal to the transmission axis.

Figure 2:
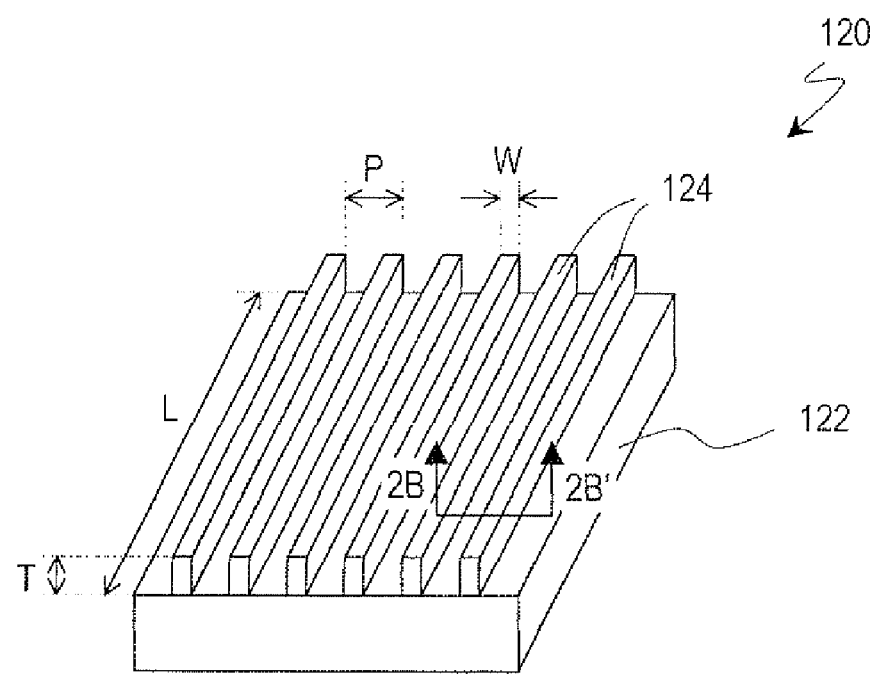
[FIG. 2](*a*) is a schematic perspective view of selective reflection polarizer in an illuminator according to the present embodiment; and (*b*) is a schematic side view along line 2B-2B' in (*a*).
Figure 2:
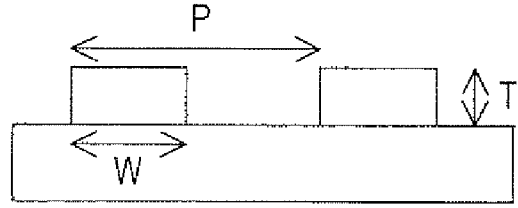

FIG. 2(a) shows a schematic perspective view of the selective reflection polarizer 120, and FIG. 2(b) shows a schematic cross-sectional view along line 2B-2B' in FIG. 2(a). The selective reflection polarizer 120 includes a transparent substrate 122 and a plurality of metal wires 124 arrayed on the transparent substrate 122. The selective reflection polarizer 120 is also called a wire grid. The plurality of metal wires 124 are disposed parallel to one another. The metal wires 124 have a constant width W and a constant pitch (period) P, such that W/P of the metal wires 124 is greater than 30% and equal to or less than 42%. In the present specification, this W/P is also referred to as a metal ratio. For example, the metal wires 124 have a width W of 45 nm, and the metal wires 124 have a pitch P of 150 nm. For example, if the width of the whole substrate over which the wire grid 120 is formed (the width of one side along a direction which is perpendicular to a length L shown in FIG. 2(a)) is 150 mm, then about 1 million metal wires 124 are arrayed. Moreover, the length L of the metal wires 124 is sufficiently larger than the pitch P, and is 150 µm, for example. Moreover, the metal wires 124 may be provided across one side of the transparent substrate 122 so that the length L of the metal wires 124 is about the length of one side of the transparent substrate 122. The metal wires 124 have a thickness T of 100 nm, for example. The width W, pitch P, thickness T, length L, etc., of the metal wires 124 can be measured by using a scanning electron microscope (SEM).

Within the light emitted from the backlight 110 shown in FIG. 1, the polarization component that has a polarization direction which is orthogonal to the direction in which the metal wires 124 extend is mainly transmitted through the selective reflection polarizer 120, whereas the polarization component that has a polarization direction which is parallel to the direction in which the metal wires 124 extend is mainly reflected at the selective reflection polarizer 120. Thus, the transmission axis of the selective reflection polarizer 120 is orthogonal to the direction in which the metal wires 124 extend, whereas a reflection axis of the selective reflection polarizer 120 is parallel to the direction in which the metal wires 124 extend. The illuminator 100 of the present embodiment is suitably used for a liquid crystal display device.

Figure 3:
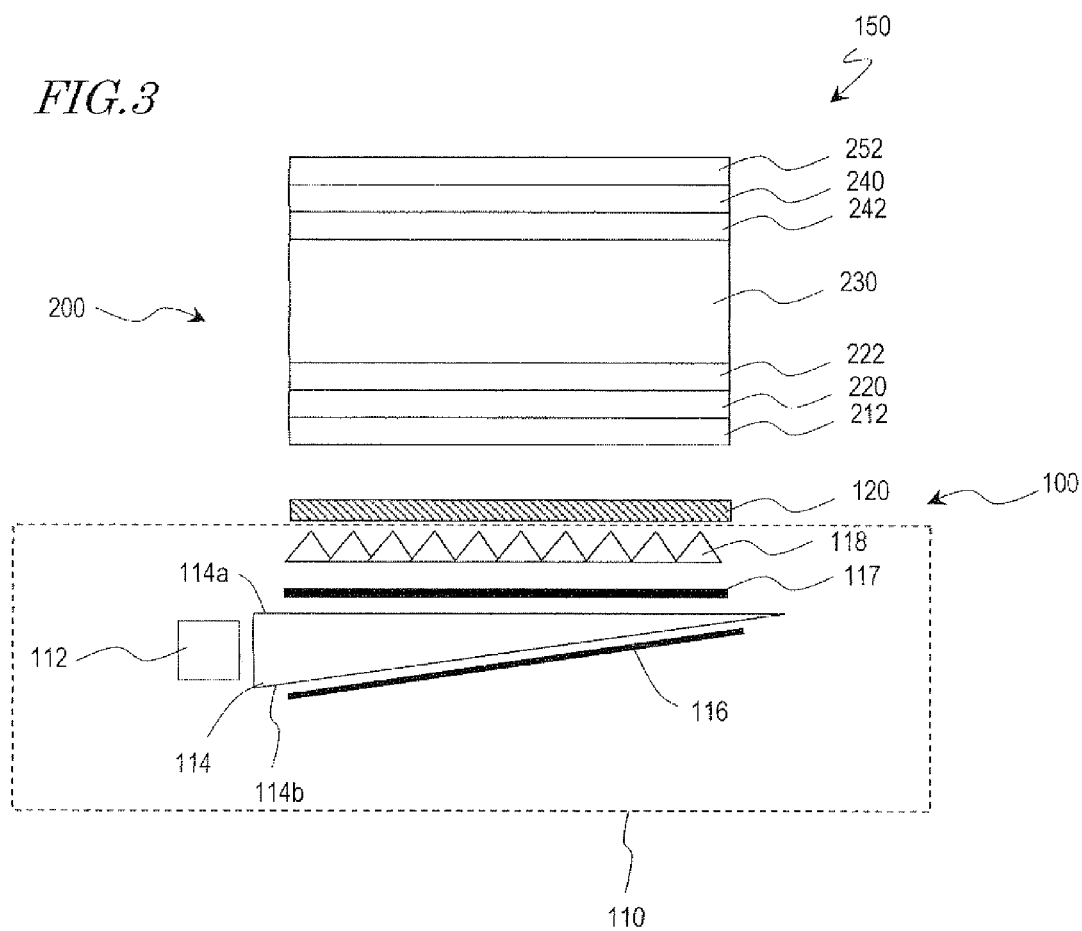
[FIG. 3] A schematic diagram showing an embodiment of a liquid crystal display device according to the present invention.

FIG. 3 shows a schematic diagram of an embodiment of a liquid crystal display device according to the present invention. A liquid crystal display device 150 of the present embodiment includes a liquid crystal panel 200 in addition to the illuminator 100, such that the selective reflection polarizer 120 is interposed between the backlight 110 and the liquid crystal panel 200.

The backlight 110 includes a light source 112 which emits light, a light guide plate 114 having an outgoing face 114a and a rear face 114b, a reflection sheet 116 opposing the rear face 114b of the light guide plate 114, a diffusion sheet 117 opposing the outgoing face 114a of the light guide plate 114, and a converging film 118. The light source 112 is a light emitting diode (LED), for example. Light which is emitted from the light source 112 is non-polarized light. The light from the light source 112 propagates through the light guide plate 114, and goes out of the outgoing face 114a of the light guide plate 114 toward the diffusion sheet 117. The diffusion sheet 117 diffuses the light exiting the outgoing face 114a of the light guide plate 114, and the converging film 118 converges the light so that a component which is perpendicular to the principal face of the liquid crystal panel 200 is increased. On the other hand, the light exiting the rear face 114b of the light guide plate 114 is reflected at the reflection sheet 116, thus going out of the outgoing face 114a of the light guide plate 114.

The light from the backlight 110 goes out toward the selective reflection polarizer 120. This light is non-polarized light. Within the light emitted from the backlight 110, most of the polarization component whose polarization direction is parallel to the transmission axis of the selective reflection polarizer 120 is transmitted through the selective reflection polarizer 120, so as to be utilized for displaying by the liquid crystal panel 200.

The liquid crystal panel 200 includes a first polarizer 212, a first transparent substrate 220, a pixel electrode 222, a liquid crystal layer 230, a second transparent substrate 240, a counter electrode 242, and a second polarizer 252. The transmission axis of the first polarizer 212 is placed in crossed nicol, so as to be orthogonal to the transmission axis of the second polarizer 252. The transmission axis of the first polarizer 212 is parallel to the transmission axis of the selective reflection polarizer 120. The polarization component of light transmitted through the selective reflection polarizer 120 is mainly parallel to the transmission axis of the selective reflection polarizer 120, but the first polarizer 212, whose degree of polarization is higher than that of the selective reflection polarizer 120, is disposed closer to the liquid crystal layer 230 than is the selective reflection polarizer 120. The degree of polarization of the selective reflection polarizer 120 is e.g. 99.6%, whereas the degree of polarization of the first polarizer 212 is e.g. 99.99%.

On the other hand, most of the polarization component of the outgoing light that has a polarization direction which is parallel to the reflection axis of the selective reflection polarizer 120 is reflected at the selective reflection polarizer 120 so as to return to the backlight 110. The light having returned to the backlight 110 is reflected at the backlight 110, and travels toward the selective reflection polarizer 120. A proportion that the light which again goes toward the selective reflection polarizer 120 accounts for in the light having returned to the backlight 110 is referred to as the reflectance of the backlight 110. In the illuminator 100 of the present embodiment, the backlight 110 has a reflectance of 0.6 to 0.8. Herein, the reflectance of a backlight means a ratio, relative to a sum total of the luminous flux amount of reflected light by a white plane which is a perfectly diffusing surface, of a sum total of the luminous flux amount of reflected light by the backlight replacing a portion of the perfectly diffusing surface. The method of measuring reflectance of a backlight will be described later. A portion of the light which is reflected at the backlight 110 and again arrives at the selective reflection polarizer 120 is transmitted through the selective reflection polarizer 120, so as to be utilized for displaying by the liquid crystal panel 200. Thus, the selective reflection polarizer 120 allows most of the component which is orthogonal to the transmission axis to be reflected toward the backlight 110 when first entering the selective reflection polarizer 120, and finally allows a portion of this light to be transmitted so as to be utilized for displaying by the liquid crystal panel 200. Thus, the efficiency of light utilization of the illuminator 100 having the selective reflection polarizer 120 is improved over that of an illuminator having a traditional polarizer which absorbs a polarization component whose polarization direction is orthogonal to the transmission axis.

Figure 4:
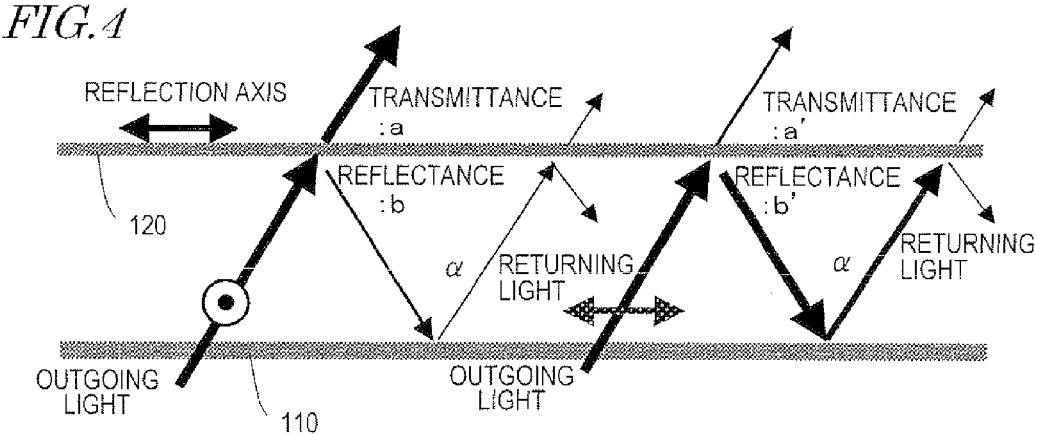
[FIG. 4] A schematic diagram for explaining transmittance and reflectance of an illuminator according to the present invention.

Hereinafter, with reference to FIG. 4, a model conceived by the inventors for realizing a further improvement in the efficiency of light utilization of the illuminator 100 will be described. FIG. 4 is illustrated so that the reflection axis of the wire grid 120 is parallel to the plane of the figure.

The light which is emitted from the backlight 110 is non-polarized light, and has both a polarization component whose polarization direction is orthogonal to the reflection axis of the wire grid 120 and a polarization component whose polarization direction is parallel thereto. Most of the polarization component whose polarization direction is orthogonal to the reflection axis of the wire grid 120 is transmitted through the wire grid 120. A transmittance a is assumed, which represents a proportion that is transmitted through the wire grid 120 within the polarization component whose polarization direction is orthogonal to the reflection axis of the wire grid 120. Note that, strictly speaking, the polarization component of light whose polarization direction is orthogonal to the reflection axis of the wire grid 120 is also partly reflected at the wire grid 120. A reflectance b is assumed, which represents a proportion that is reflected at the wire grid 120 within she polarization component whose polarization direction is orthogonal to the reflection axis of the wire grid 120. In this case, a>b.

On the other hand, within the light emitted from the backlight 110, most of the component which is parallel to the reflection axis of the wire grid 120 is reflected at the wire grid 120. A reflectance b' is assumed, which represents a proportion that is reflected at the wire grid 120 within the polarization component whose polarization direction is parallel to the reflection axis of the wire grid 120. Moreover, strictly speaking, a portion of this polarization component is transmitted through the wire grid 120, without being reflected at the wire grid 120. A transmittance a' is assumed, which represents a proportion that is transmitted through the wire grid 120 within the polarization component whose polarization direction is parallel to the reflection axis of the wire grid 120. In this case, a'<b'.

Comparisons between transmittances a and a' and reflectances b and b' of the wire grid 120: a>a', b<b'. Note that a+b<1, a'+b'<1, and it is not true that 1−a=b, 1−a'=b'. The reason is that the wire grid 120 includes the metal wires 124, so that a portion of the light is absorbed by the metal wires 124. This reason is similar to why an aluminum (Al) film which does not transmit light does not have a reflectance of 1.

Light which has been reflected at the reflectance b and reflectance b' travels in the direction of returning to the backlight 110. This light passes through the converging film 118 and the diffusion sheet 117 shown in FIG. 3 and is reflected at the light guide plate 114 and the underlying reflection sheet 116, and thereafter a portion thereof again goes out from the outgoing face of the backlight 110 toward the wire grid 120. Thus, the light which is once reflected at the wire grid 120 and again goes out toward the wire grid 120 is referred to as returning light. Herein, within the light being reflected at the wire grid 120 and returning to the backlight 110, the proportion becoming the returning light is assumed to be $\alpha$. This $\alpha$ represents the reflectance of the backlight 110. The reflectance $\alpha$ depends on the optical characteristics and positioning and the like of the optical elements included in the backlight 110 (the reflection sheet 116, the diffusion sheet 117, the converging film 118, etc., shown in FIG. 3). The light having returned to the backlight 110 passes through the converging film 118, the diffusion sheet 117, and the like, and its polarization direction when reflected at the wire grid 120 is not maintained. Herein, it is assumed that the returning light is non-polarized light. Similarly to the above description, the returning light is again reflected at the reflectances b and b', and transmitted at the transmittances a and a'. Within the returning light, the light again reflected at the reflectances b and b' returns to the backlight 110 again. Theoretically, such transmission and reflection is repeated an infinite number of times.

The light transmitted through the wire grid 120 contains not only a polarization component whose polarization direction is orthogonal to the reflection axis of the wire grid 120, but also a polarization component whose polarization direction is parallel to the reflection axis of the wire grid 120. However, the polarization component which is meant to be selected by the wire grid 120 is a polarization component whose polarization direction is orthogonal to the reflection axis of the wire grid 120, and not a polarization component whose polarization direction is parallel to the reflection axis of the wire grid 120. Within the light transmitted through the wire grid 120 of the liquid crystal display device 150 shown in FIG. 3, the polarization component whose polarization direction is parallel to the reflection axis of the wire grid 120 is absorbed by the first polarizer 212.

Moreover, the luminous flux amount of the light selected by the wire grid 120 (i.e., light whose polarization direction is orthogonal to the reflection axis of the wire grid 120 within the light transmitted through the wire grid 120) is a total of the luminous flux amount of light which has been transmitted without even being reflected once at the wire grid 120 and the luminous flux amount of the light which has been transmitted through the wire grid 120 after being reflected at the wire grid

120 one or more times. The total luminous flux amount of the light selected by the wire grid 120 is:

$$I = I_0/2 * (a/(1 - \alpha((b+b')/2))) \quad \text{(eq. 1)}.$$

Herein, $I_0$ represents the luminous flux amount of light first emitted from the backlight 110 toward the wire grid 120. Moreover, the luminous flux amount I contains the luminous flux up to an infinite number of times of returning.

Note that, ideally, the transmittance a=1.0; the transmittance a'=0.0; the reflectance b=0.0; and the reflectance b'=1.0, and the backlight 110 has a reflectance α=1.0. By substituting these into (eq. 1), the luminous flux amount I of the light selected by the wire grid 120 equals $I_0$, such that all of the light entering the wire grid 120 is the light selected by the wire grid 120.

Imaginarily assuming that the transmittance a=0.8, the transmittance a'=0.2, the reflectance b=0.2, and the reflectance b'=0.8 and that the wire grid 120 has a reflectance α=1.0, if these are substituted in (eq. 1), the luminous flux amount I of the light selected by the wire grid 120 will be $0.8I_0$. In this imaginary case, absorption of light by the wire grid 120 is ignored, and within the luminous flux amount $I_0$ of light first emitted from the backlight 110 toward the wire grid 120, the light transmitted through the wire grid 120 at the transmittance a' is absorbed by the incident-side polarizer of the liquid crystal panel, and therefore a sum total of light excluding this is the light selected by the wire grid 120. Now, an efficiency of light utilization will be calculated. By nature, the light to be utilized in a liquid crystal panel is only a polarization component whose polarization direction is parallel to the transmission axis of the incident-side polarizer of the liquid crystal panel, and thus has a luminous flux amount of $0.5I_0$. As described above, the light selected by the wire grid 120 has a luminous flux amount I of $0.8I_0$, and thus the efficiency of light utilization is $1.6 (= 0.8I_0 \div 0.5I_0)$.

According to this model, as can be understood from (eq. 1), the luminous flux amount of the light selected by the wire grid 120 is a mathematical function of $I_0$, the transmittances a and a', the reflectances b and b', and the reflectance α of the backlight 110. The transmittances a and a' and the reflectances b and b' change in accordance with the pitch P, the width W, the thickness T, and the metal ratio (W/P) of the metal wires 124. Generally speaking, as the metal ratio (W/P) increases, the transmittance a decreases and the reflectance b' increases.

Moreover, as described earlier, the luminous flux amount I is a sum of the luminous flux amount of the light transmitted through the wire grid 120 without being reflected at the wire grid 120 and the luminous flux amount of the light transmitted through the wire grid 120 after being reflected at the wire grid 120 one or more times. Now, the luminous flux amount of the light transmitted through the wire grid 120 without being reflected at the wire grid 120 will be represented as $I_1$, whereas the luminous flux amount of the light transmitted through the wire grid 120 after being reflected at the wire grid 120 one or more times will be represented as $I_2$. The luminous flux amount $I_1$ is strongly related to the transmittance a of the wire grid 120, whereas the luminous flux amount $I_2$ is strongly related to not only the transmittance a of the wire grid 120 but also the reflectances b and b' and the reflectance α of the backlight 110. As the transmittance a of the wire grid 120 increases, the luminous flux amount $I_1$ increases. Moreover, as the reflectances b and b' of the wire grid 120 and the reflectance α of the backlight 110 increase, the luminous flux amount $I_2$ increases.

The inventors have arrived at a finding that, in order to improve the efficiency of light utilization of an illuminator having a wire grid, it is important to not only vary the pitch, width, and metal ratio of the metal wires in the wire grid, but also take into consideration the reflectance of the backlight.

Figure 5:
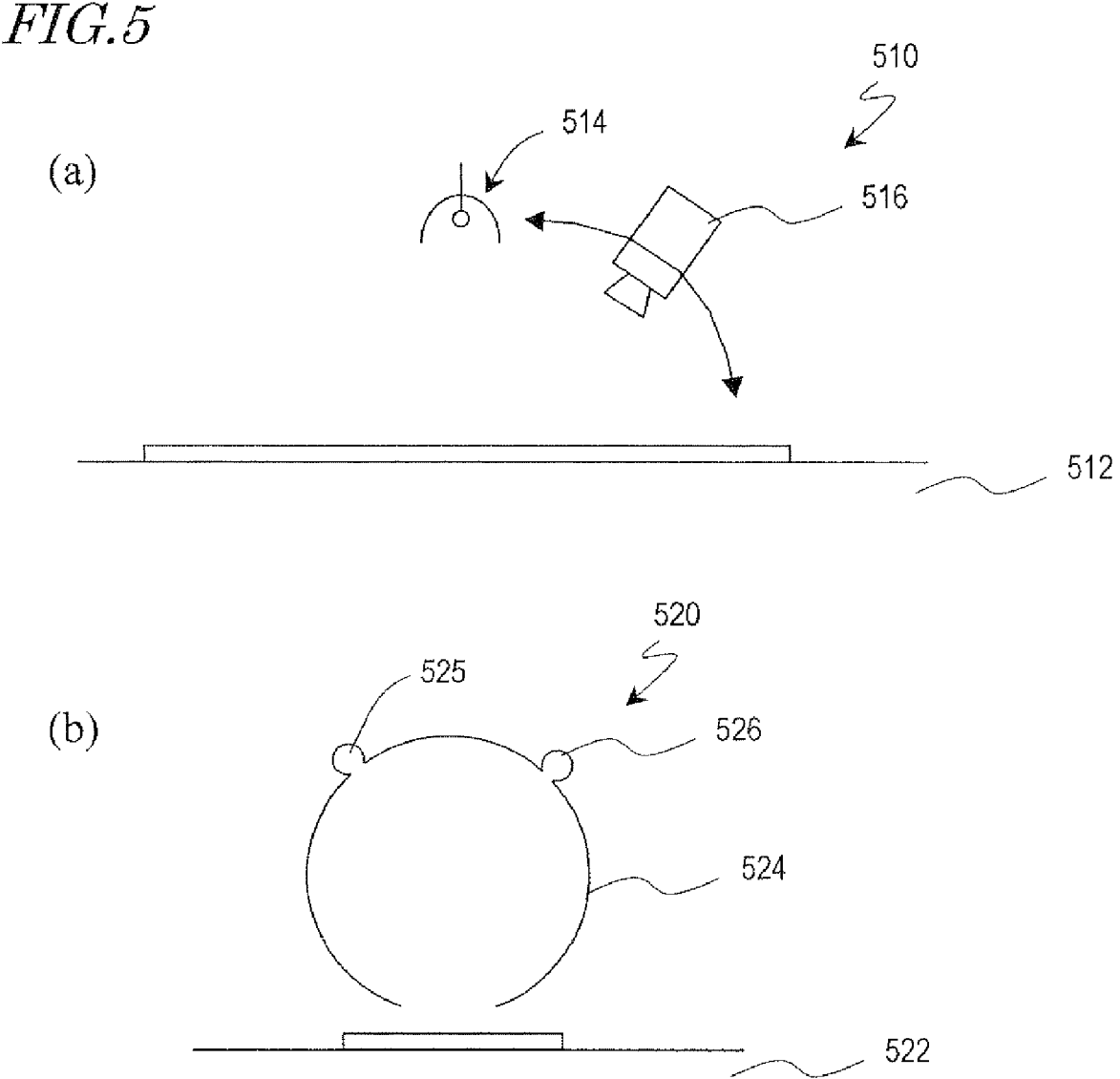
[FIG. 5](*a*) and (*b*) are schematic diagrams of reflectance measurement systems for measuring reflectance of a backlight.

Hereinafter, with reference to FIG. 5, a reflectance measurement system for measuring the reflectance of a backlight will be described. FIG. 5(a) shows a schematic diagram of the reflectance measurement system 510. The reflectance measurement system 510 includes a support base 512 for supporting a backlight, a light source 514 disposed above the support base 512, and a luminance meter 516. When a backlight is placed on the support base 512, the light source 514 will be located above the center of the backlight. As the luminance meter 516, a luminance meter BM-5 (manufactured by TOPCON CORPORATION) is used, for example. The luminance meter 516 is capable of moving in a polar angle direction from near the light source 514.

The reflectance measurement system 510 measures the reflectance of a backlight in a manner described below. The backlight is deactivated, and light is radiated from the light source 514 toward the backlight. The luminance meter 516 measures a luminous flux amount of the light reflected at the deactivated backlight. Moreover, the luminance meter 516 is moved in polar angle directions from near the light source 514, and a luminous flux amount is measured for each polar angle. Thereafter, the luminances with respect to polar angles are integrated, and a reflectance is calculated relative to the outgoing light amount. In this case, as the light source 514, a light source which emits a light beam having a high degree of parallelism is more desirable than a divergent light source. The reason is that, if the light from the light source diverges, it becomes difficult to assume a degree of reflection with respect to the outgoing light amount. It is desirable that the degree of parallelism is about 5°. The reflectance measurement system 510 is suitably used in the case where the backlight has a large size.

Note that the reflectance measurement system is not limited to the reflectance measurement system 510 shown in FIG. 5(a). FIG. 5(b) shows a schematic diagram of another reflectance measurement system 520.

The reflectance measurement system 520 includes a support base 522 for supporting a backlight, and a reflectance measuring device 524 having an integrating sphere. A lamp 525 and a photometer 526 are provided in the reflectance measuring device 524. As the reflectance measuring device 524, a reflectance measuring device manufactured by Minolta Corporation can be used, for example. When a backlight is placed on the support base 522, the lamp 525 will be located above the backlight. Tilting the photometer 526, taking measurements and integrating them are performed with the integrating sphere. Consequently, the reflectance measurement system 520 also performs a similar measurement to that which is performed by the reflectance measurement system 510. The reflectance measurement system 520 is suitably used in the case where the backlight has a small size.

Figure 6:
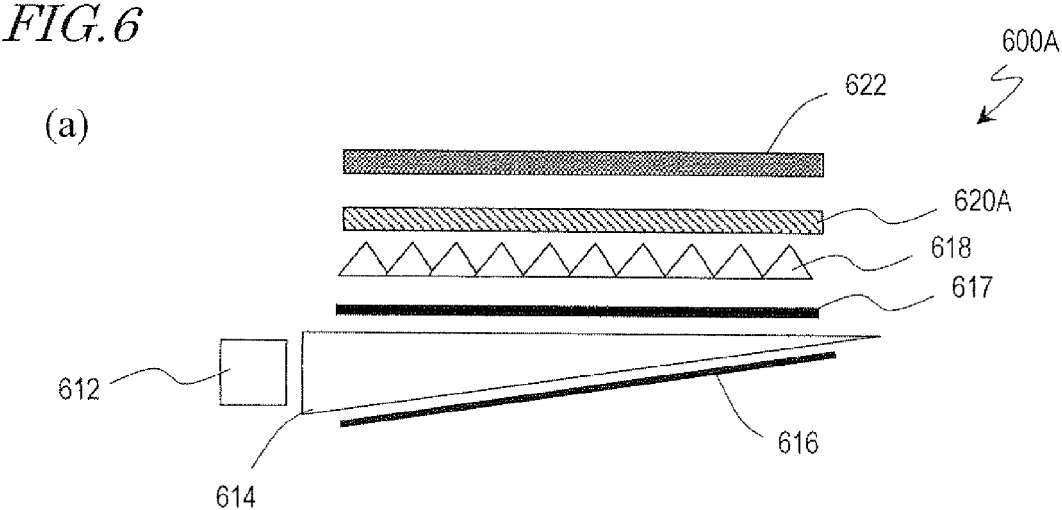
[FIG. 6](*a*) and (*b*) are schematic diagrams of illuminators of Comparative Example 1 and Comparative Example 2, respectively.

Now, for comparison with the illuminator 100 of the present embodiment, illuminators of Comparative Example 1 and Comparative Example 2 will be described with reference to FIG. 6 and FIG. 7.

FIG. 6(a) shows the construction of an illuminator 600A of Comparative Example 1, and FIG. 6(b) shows the construction of an illuminator 600B of Comparative Example 2. In the illuminator 600A of Comparative Example 1, a commercially-available wire grid (manufactured by MOXTEK, Inc.) is used as a selective reflection polarizer 620A. The metal wires of this wire grid are made of Al (aluminum), such that the metal wires have a pitch of 150 nm; the metal wires have a width of 75 nm; the metal wires have a metal ratio of 50%;

and the metal wires have a thickness of 100 nm. In the illuminator 600B of Comparative Example 2, DBEF (Dual Brightness Enhancement Films) (manufactured by 3M Company), which is a first type of selective reflection polarizer, is used as a selective reflection polarizer 620B. Note that the illuminator 600B of Comparative Example 2 has a similar construction to that of the illuminator 600A of Comparative Example 1 except for the selective reflection polarizer 620B. In the illuminators 600A and 600B of Comparative Example 1 and Comparative Example 2, in order to remove any components other than the polarization component selected by the selective reflection polarizers 620A and 620B, a polarizer 622 having a transmission axis which is parallel to the transmission axes of the selective reflection polarizers 620A and 620B is provided.

Figure 7:
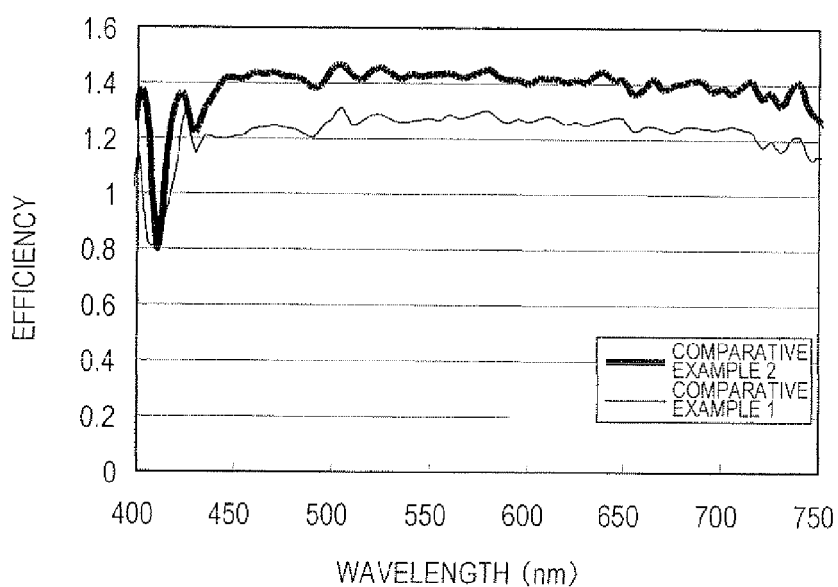
[FIG. 7] A graph showing ratios of luminous flux to wavelength of illuminators of Comparative Example 1 and Comparative Example 2.

With reference to FIG. 7, the efficiency of light utilization of the illuminators of Comparative Example 1 and Comparative Example 2 will be described. FIG. 7 shows results of measuring efficiencies of light utilization of the illuminators of Comparative Example 1 and Comparative Example 2. The efficiency of light utilization measurements for the illuminators of Comparative Example 1 and Comparative Example 2 were performed as follows. The illuminators of Comparative Example 1 and Comparative Example 2 were placed in the integrating sphere, and the total emitted luminous fluxes of the illuminators of Comparative Example 1 and Comparative Example 2 were measured. Moreover, the total emitted luminous fluxes traveling from the backlight through the polarizer were measured after removing the selective reflection polarizers from the illuminators of Comparative Example 1 and Comparative Example 2. Moreover, an efficiency of light utilization was defined to be a result of dividing the total emitted luminous flux value of an illuminator having a selective reflection polarizer by the total emitted luminous flux value of the illuminator lacking a selective reflection polarizer.

As is seen from the graph of FIG. 7, the efficiency of light utilization is improved regardless of whether a wire grid is used or a dielectric multilayer film is used as the selective reflection polarizer. Moreover, the illuminator of Comparative Example 1 having a wire grid has a lower efficiency of light utilization than that of the illuminator of Comparative Example 2 having DBEF. This is because the transmittance and reflectance of the wire grid with respect to polarized light are lower than those of DBEF. Specifically, the transmittance and reflectance of DBEF are both about 90%, whereas the transmittance and reflectance of the aforementioned wire grid are both about 85%. The average efficiency of utilization of the illuminator of Comparative Example 1 having a wire grid is 1.23 across wavelengths from 450 nm to 700 nm, whereas the average efficiency of utilization of the illuminator of Comparative Example 2 having DOFF is 1.39. Thus, generally speaking, an illuminator in which a wire grid is used as a selective reflection polarizer has a lower efficiency of light utilization than that of an illuminator in which a dielectric multilayer film is used. Note that, by using the reflectance measurement system 510 or the reflectance measurement system 520 shown in FIG. 5, the reflectance α of the backlights used in the illuminators of Comparative Examples 1 and 2 was measured, which indicated that the backlight reflectance α was 0.65 to 0.75 as an average across the visible light region.

Now, based on the model described above with reference to FIG. 4, the characteristics of the illuminator and the wire grid will be described. First, the transmittance and reflectance of the wire grid are calculated by varying the metal ratio W/P through simulation. From these transmittance and reflectance, the transmittances a and a' and the reflectances b and b' in the model are determined and substituted into (eq. 1), whereby a luminous flux amount is obtained. Note that, as the metal ratio W/P increases, the transmittance a decreases and the reflectance b' increases, as has been mentioned above.

Figure 8:
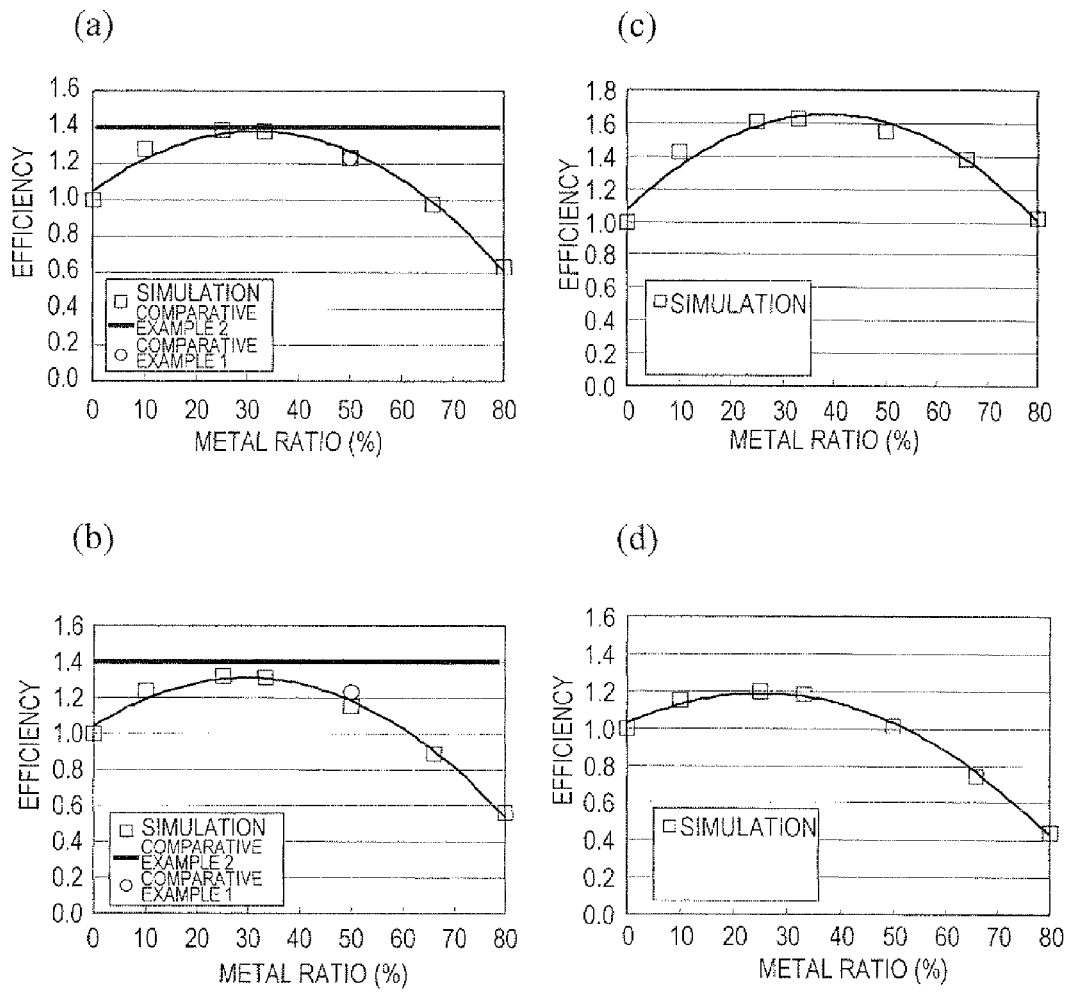
[FIG. 8](*a*) to (*d*) are graphs showing changes in the efficiency of light utilization with respect to metal ratios (as defined later) in the case where the reflectance of a backlight is 76%, 68%, 100%, and 50%, respectively.

Hereinafter, with reference to FIG. 8, the influence of the backlight reflectance on the efficiency of light utilization of an illuminator will be described. FIG. 8($a$) to FIG. 8($d$) show changes in the efficiency with respect to metal ratios in the case where the reflectance of the backlight is 76%, 68%, 100%, or 50%, respectively. On the vertical axis, a value obtained by dividing a result according to eq. 1) by $I_0/2$ is indicated as efficiency. This $I_0/2$ corresponds to the fact that, when non-polarized light of a luminous flux amount $I_0$ is transmitted through an ideal polarizer, the luminous flux amount $I_0$ will become ½.

In the case where there is no wire grid, or where the metal ratio is 0 (i.e., the width W of the metal wires is 0) so that there are no metal wires and only the transparent substrate, the efficiency is 1.0. This means that the content of the parentheses on the right-hand side in (eq. 1) is 1.0. Therefore, in the case where the efficiency is 1.0, even if there is the selective reflection polarizer, it can be said that its effect is not being attained. On the other hand, in the case where the efficiency is greater than 1.0, it means that a portion of the polarization component which is absorbed by the incident-side polarizer of the liquid crystal panel is reused, such that the effect of the selective reflection polarizer is being attained. Although not shown in the graph of FIG. 8, a metal ratio of 100% corresponds to a metal film, through which light is not transmitted, and the efficiency is 0. Herein, the metal wires have a pitch of 150 nm.

In FIG. 8, white circles show actual measurement values of the illuminator of Comparative Example 1. As described earlier, in the illuminator of Comparative Example 1, a wire grid having metal wires with a metal width of 50% and a pitch of 150 nm is used. Moreover, actual measurement values of the illuminator of Comparative Example 2 having DBEF are shown by thick lines in FIG. 8($a$) and FIG. 8($b$). Note that the linear indication for DBEF is because it does not admit of a notion of metal width.

First, FIG. 8($a$) is referred to. Herein, the backlight has a reflectance α of 76%.

As described earlier, the luminous flux amount I is a sum of the luminous flux amount $I_1$ of light which is transmitted through the wire grid without being reflected at the wire grid and the luminous flux amount $I_2$ of light which is transmitted through the wire grid after being reflected at the wire grid one or more times. As the metal ratio decreases, the luminous flux amount $I_1$ increases, and the luminous flux amount $I_2$ decreases. Conversely, as the metal ratio increases, the luminous flux amount $I_1$ decreases and the luminous flux amount $I_2$ increases.

As shown in FIG. 8($a$), in a range from 0 to a certain value, the efficiency increases as the metal ratio increases. This is because, although the luminous flux amount $I_1$ decreases as the metal ratio increases, the increase in the luminous flux amount $I_2$ is larger than the decrease in the luminous flux amount $I_1$, so that the luminous flux amount I, i.e., efficiency, is increased as a whole. On the other hand, when the metal ratio becomes too large, the efficiency begins to decrease. This is because, when the metal ratio becomes too large, the decrease in the luminous flux amount $I_1$ becomes larger than the increase in the luminous flux amount $I_2$, so that the luminous flux amount I, i.e., efficiency, is decreased as a whole. Therefore, the efficiency takes a maximal with respect to the metal ratio. In the following description, the metal ratio at which the efficiency takes a maximal will be referred to as a "maximal metal ratio". The maximal metal ratio is lower than 50%. As shown in FIG. 8(a), the local maximum of efficiency is about 1.4. Note that this value is close to that of the illuminator of Comparative Example 2 having DEEP. Even if a wire grid is employed, by effectively varying the metal ratio, the efficiency can be improved to substantially a similar level to that of the illuminator of Comparative Example 2 having DEEP. Note that the reason why the illuminator of Comparative Example 2 having DBEF has a slightly higher efficiency is that the transmittance and reflectance of the DEEP are higher than those of the wire grid.

Next, FIG. 8(b) is referred to. Herein, the backlight has a reflectance of 68%. In this case, the local maximum of efficiency is greater than 1.3, although not as large as the value of the illuminator of Comparative Example 2 having DBEF. The maximal metal ratio is about 30%.

As described above, even when a wire grid which is advantageous in terms of thermal resistance and thickness is used as the selective reflection polarizer, the efficiency can also be improved by ensuring that the metal width (W) is about 30% of the pitch (P). Therefore, without a substantial decrease in the efficiency of light utilization, a thin illuminator having better thermal resistance than conventionally can be produced. Note that, since the actual measurement value of the illuminator of Comparative Example 1 having a traditional backlight and a commercially-available wire grid is substantially equal to the calculated value, it is considered that the model described with reference to FIG. 4 and (eq. 1) is basically appropriate.

For a further discussion of the relationship between the backlight reflectance and the efficiency, changes in the efficiency when the reflectance $\alpha$ of the backlight is varied between 1.0 and 0.5 will be described. As shown in FIG. 8(c), when the reflectance of the backlight is 1.0, the light returning to the backlight undergoes total reflection. In this case, the maximal metal ratio is about 40%, and the local maximum is greater than 1.6. Note that, in practice, it is difficult to produce a backlight with a reflectance of 1.0, and this is only an imaginary case. On the other hand, as shown in FIG. 8(d), when the reflectance of the backlight is 0.5, the maximal metal ratio is about 25%, and the local maximum is about 1.2.

As will be understood from a comparison between FIG. 8(a) to FIG. 8(d), given the same metal ratio, the efficiency of light utilization increases as the reflectance the backlight increases. This is because, given the same metal ratio, although the luminous flux amount $I_1$ is equal, the luminous flux amount $I_2$ increases as the reflectance of the backlight increases.

Figure 9:
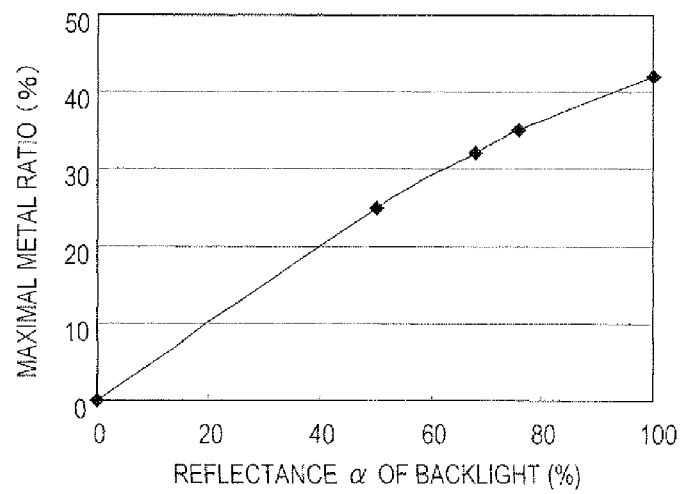
[FIG. 9] A graph showing a relationship between the reflectance of a backlight and a metal ratio.

FIG. 9 shows a relationship between the reflectance of the backlight and the maximal metal ratio. The maximal metal ratio has a substantially linear correlation with the backlight reflectance. As shown in FIG. 9, the maximal metal ratio can be determined by determining the backlight reflectance.

When the reflectance $\alpha$ of the backlight is relatively low, there is little light that, even if reflected at the wire grid, is reflected by the backlight so as to return to the wire grid. In this case, the maximal metal ratio is relatively low. The reason is that, even if the reflectance b' of the wire grid is somewhat low, if the transmittance a of the wire grid is high, a large proportion of the polarization component whose polarization direction is parallel to the transmission axis of the wire grid is initially transmitted through the wire grid. Thus, in the case where the reflectance $\alpha$ of the backlight is relatively low, it is effective to give priority to suppressing the decrease in the transmittance a than increasing the reflectance b', that is, give priority to suppressing the decrease in the luminous flux amount than increasing the luminous flux amount $I_2$.

On the other hand, when the reflectance $\alpha$ of the backlight is relatively high, most of the light reflected at the wire grid returns to the wire grid. In this case, the maximal metal ratio is relatively high. Even if the transmittance a of the wire grid is somewhat low, if the reflectance b' of the wire grid is high, the polarization component whose polarization direction is initially orthogonal to the transmission axis of the wire grid returns to the wire grid with its polarization direction changed. Thus, in the case where the reflectance $\alpha$ of the backlight is relatively high, it is effective to give priority to an increase in the reflectance b' than a decrease in the transmittance a, i.e., give priority to an increase in the luminous flux amount $I_2$ than a decrease in the luminous flux amount $I_1$.

Note that, if the backlight reflectance is 100%, all of the light reflected at the wire grid returns to the wire grid. In this case, the maximal metal ratio is 42%, and the maximal metal ratio is not so high as 50%. This is because absorption of light occurs at the wire grid, so that the luminous flux amount $I_2$ never exceeds the luminous flux amount $I_1$. From the above, as the backlight reflectance becomes lower, the maximal metal ratio shifts toward the lower side. Note that, in the case where the backlight reflectance is 0 (i.e., there is no returning light), the maximal metal ratio is 0, and its efficiency is 1.0.

Figure 10:
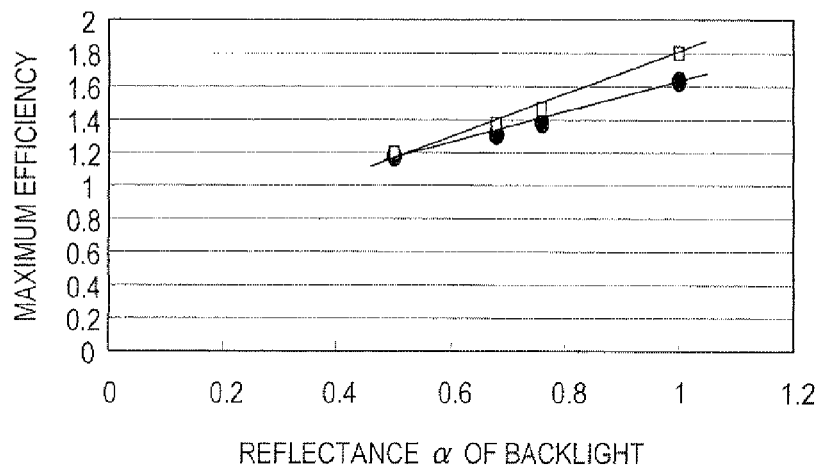
[FIG. 10] A graph showing a relationship between the reflectance of a backlight and efficiency.

FIG. 10 shows changes in the local maximum of efficiency (maximum efficiency) with respect to the reflectance $\alpha$ of the backlight. Circles represent the maximum efficiency of the illuminator with respect to the backlight reflectance shown in FIG. 8(a) to FIG. 8(d). Note that the metal wires have a pitch of 150 nm.

As shown in FIG. 10, as the reflectance $\alpha$ of the backlight increases, the maximum efficiency also increases. This can be ascribed to the fact that, given at least the same metal ratio, the luminous flux amount $I_2$ increases as the reflectance $\alpha$ of the backlight increases, without any change in the luminous flux amount $I_1$.

The graph of FIG. 10 also indicates, with squares, values of maximum efficiency of an illuminator having DBEF instead of a wire grid, for reference. This illuminator includes the aforementioned DBFF as the selective reflection polarizer, together with a backlight having reflectance as indicated on the x axis.

As has been described above with reference to FIG. 9, in an illuminator having a wire grid, the maximal metal ratio varies in accordance with the backlight reflectance, and the transmittance and reflectance of the wire grid corresponding to a maximum efficiency changes in accordance with the backlight reflectance. On the other hand, the notion of aperture (e.g., the metal ratio of a wire grid) does not belong to DOFF, and the transmittance and reflectance of DBEF are constant. Therefore, changes in the efficiency of an illuminator having DOFF are based on the changes in the luminous flux amount $I_2$, which are ascribable to changes in the backlight reflectance.

As described above, the transmittance and reflectance of DOFF have higher values than those of a wire grid, and therefore the efficiency of an illuminator having DOFF is higher than the efficiency of an illuminator having a wire grid. Moreover, as will be understood from FIG. 10, in the case where the reflectance $\alpha$ of the backlight is 0.5, the efficiency of an illuminator having DBEF is substantially equal to the efficiency of an illuminator having a wire grid. As the reflectance $\alpha$ of the backlight becomes greater above 0.5, the difference between the efficiency of an illuminator having DBEF and the efficiency of an illuminator having a wire grid increases. In an illuminator having a wire grid, as has been described above with reference to FIG. 9, the maximal metal ratio increases as the backlight reflectance increases. As a result, as the transmittance of the wire grid decreases, the reflectance of the wire grid increases, and the luminous flux amount decreases and the luminous flux amount $I_2$ increases. On the other hand, as described above, the transmittance and reflectance of DBEF are constant, and when the backlight reflectance changes from 0.5 to 1.0, the luminous flux amount $I_2$ increases without any decrease in the luminous flux amount $I_1$. Therefore, the increase in the efficiency of an illuminator having DBEF is greater than that of an illuminator having a wire grid. Note that a component which is absorbed by the wire grid also contributes to this.

However, in practice, the reflectance α of the backlight will never be 1.0. As will be understood from the graph of FIG. 10, if the backlight reflectance is 0.6 to 0.8, the maximum efficiency of an illuminator having a wire grid can be made substantially similar to the maximum efficiency of an illuminator having DBEF.

Figure 11:
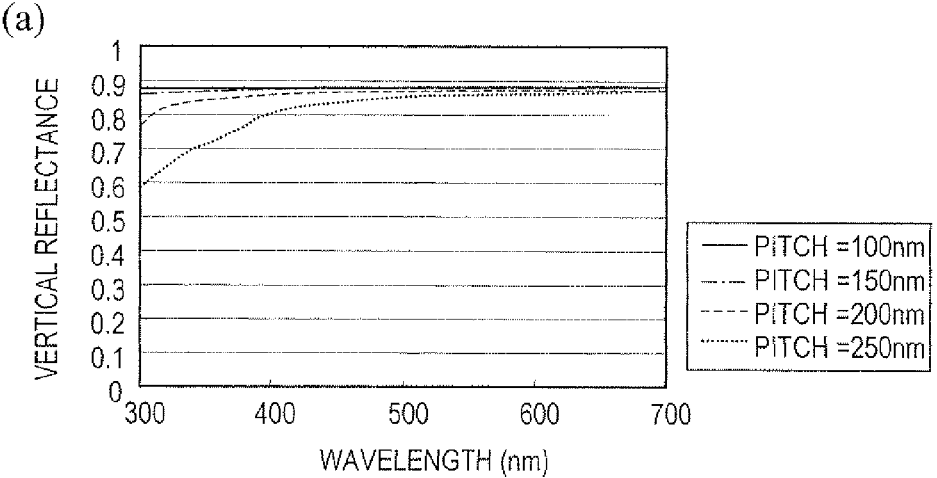
[FIG. 11](a) is a graph showing the pitch dependence of vertical reflectance (as defined later) with respect to wavelengths; and (b) is a graph showing the pitch dependence of parallel transmittance (as defined later) with respect to wavelengths.
Figure 11:
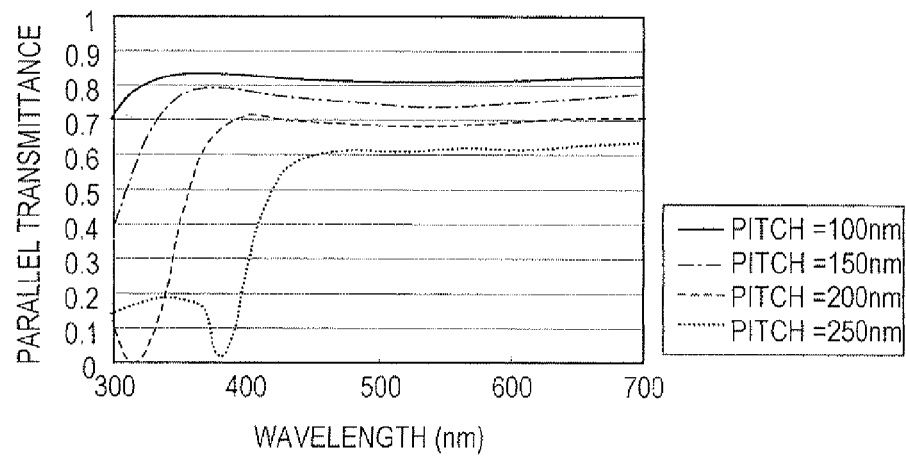
Figure 12:
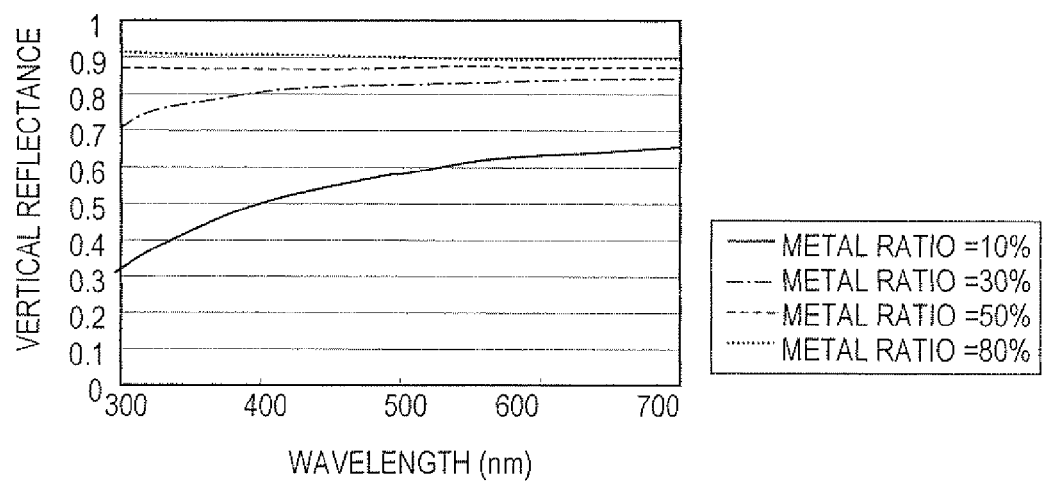
[FIG. 12](a) is a graph showing the metal ratio dependence of vertical reflectance with respect to wavelengths; and (b) is a graph showing the metal ratio dependence of parallel transmittance with respect to wavelengths.
Figure 12:
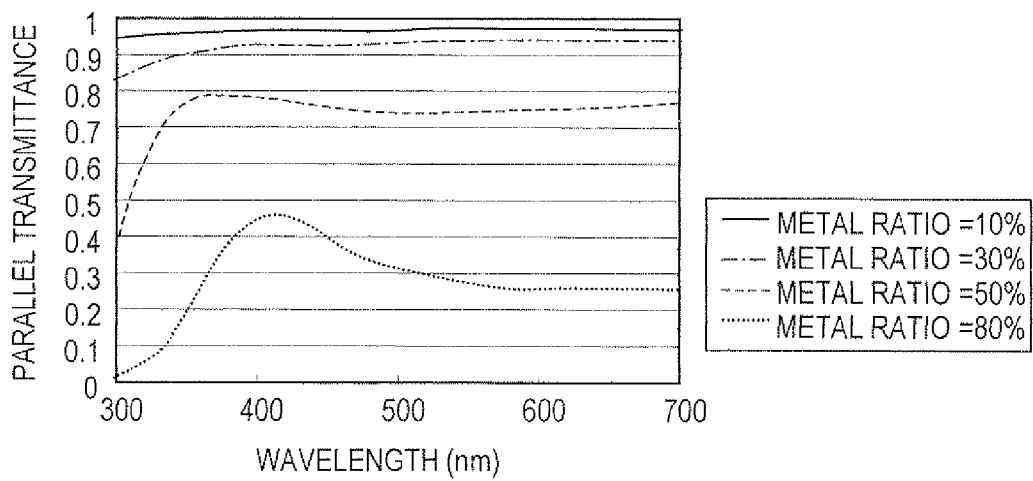
Figure 13:
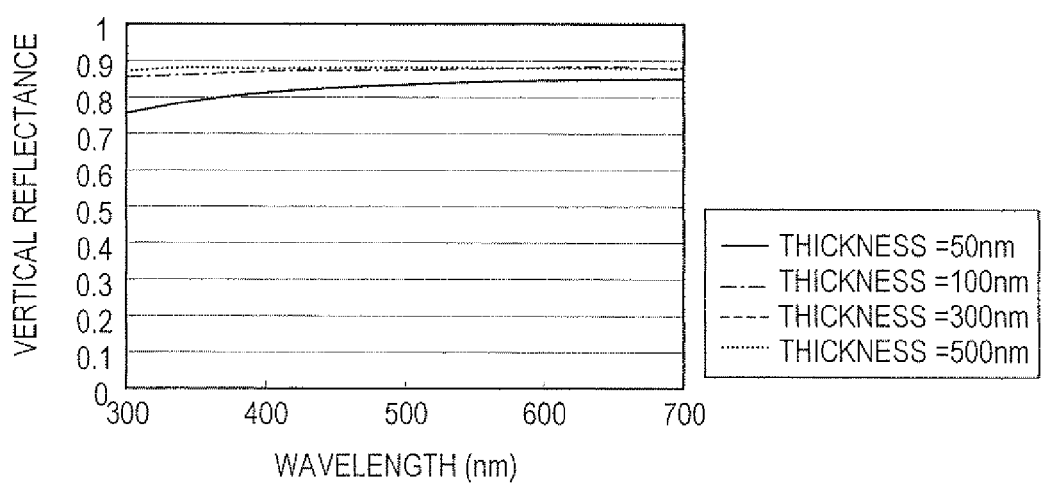
[FIG. 13](a) is a graph showing the metal thickness dependence of vertical reflectance with respect to wavelengths; and (b) is a graph showing the metal thickness dependence of parallel transmittance with respect to wavelengths.
Figure 13:
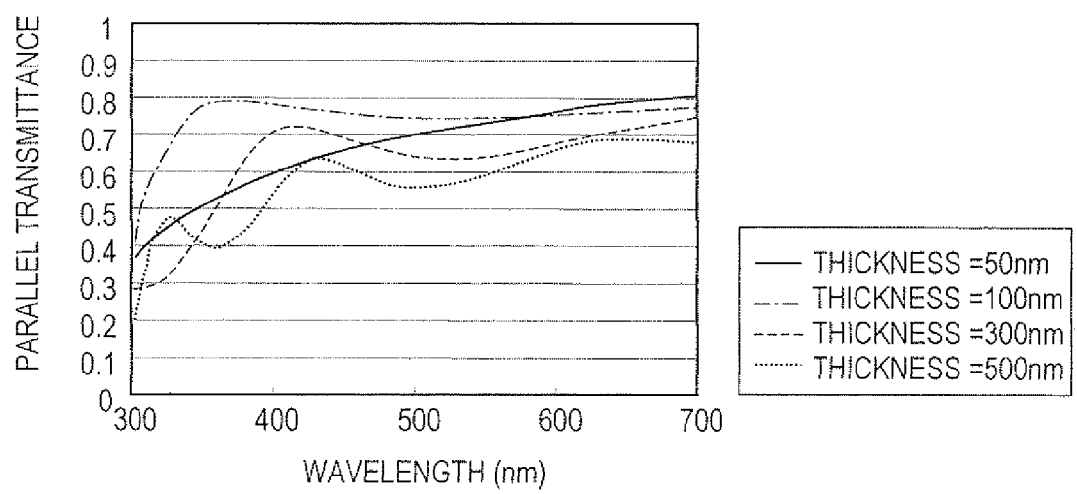

Hereinafter, characteristics of the wire grid itself will be described with reference to FIG. 11 to FIG. 13.

First, with reference to FIG. 11, pitch dependence of the metal wires will be described. FIG. 11(a) shows the pitch dependence of vertical reflectance with respect to wavelengths, and FIG. 11(b) shows the pitch dependence of parallel transmittance with respect to wavelengths. The vertical reflectance represents a reflectance of the wire grid when irradiated with linearly polarized light having a crossed nicol relationship with the transmission axis of the wire grid, corresponding to the reflectance b' shown in FIG. 4. On the other hand, the parallel transmittance represents a transmittance of the wire grid when irradiated with linearly polarized light having a parallel nicol relationship with the transmission axis of the wire grid, corresponding to the transmittance a shown in FIG. 4. Herein, the pitch (P) is varied between 100 nm, 150 nm, 200 nm, and 250 nm. Note that the metal ratio is 50%, and the metal width (W) is 50 nm, 75 nm, 100 nm, and 125 nm, respectively.

As shown in FIG. 11(a), as the pitch increases, the vertical reflectance (reflectance of the polarization component whose polarization direction is orthogonal to the transmission axis of the selective reflection polarizer) decreases. This is because, as the width across which no metal wires are provided becomes larger relative to the wavelength, the transmitted component increases and the reflected component decreases. Therefore, as the wavelength becomes shorter, the vertical reflectance becomes lower. Moreover, when the pitch is equal to or less than 200 nm, the vertical reflectance remains substantially constant between 400 nm and 700 nm, which corresponds to the visible light region.

Moreover, as shown in FIG. 11(b), as the pitch increases, the parallel transmittance (transmittance of the polarization component whose polarization direction is parallel to the transmission axis of the selective reflection polarizer) decreases. This is because polarization selectivity decreases with increase in the pitch, and approaches the aperture width ratio of the wire grid as an extreme. In the case where the pitch of the metal wires corresponds to ½ of the wavelength, light is not transmitted through the wire grid, so that the transmittance drastically decreases especially at lower wavelengths. When the pitch is 200 nm or less, the parallel transmittance remains substantially constant in a wavelength range of 400 nm to 700 nm, which corresponds to the visible light region. From the above, the pitch of the metal wires is preferably 200 nm or less, and more preferably 150 nm or less.

Next, with reference to FIG. 12, the metal ratio dependence will be described. FIG. 12(a) shows the metal ratio dependence of vertical reflectance with respect to wavelengths, and FIG. 12(b) shows the metal ratio dependence of parallel transmittance with respect to wavelengths. Herein, the metal wires have a pitch of 150 nm, and the metal ratio is varied between 10%, 30%, 50%, and 80%.

As shown in FIG. 12(a), the vertical reflectance decreases as the metal ratio decreases. This is because, as the width across which no metal wires are provided becomes larger relative to the wavelength, the transmitted component increases and the reflected component decreases. Therefore, as the wavelength of light becomes shorter, the vertical reflectance becomes lower. Moreover, when the metal ratio is greater than 30%, the vertical reflectance remains substantially constant at or above 80%, across a wavelength range of 400 nm to 700 nm, which corresponds to the visible light region. Therefore, it is preferable that the metal ratio is greater than 30%. Note that the reflectance increases as the metal ratio increases. From the standpoint of reflectance alone, it is preferable that the metal ratio is as high as possible.

Moreover, as shown in FIG. 12(b), the parallel transmittance decreases as the metal ratio increases. This is because, as the width across which metal wires are provided increases, the reflected component increases and the transmitted component decreases. It is preferable that the metal ratio is 50% or less. When the metal ratio is 30% or less, the transmittance exceeds 90%, and the metal ratio remains substantially constant with respect to changes in wavelength, in a wavelength range of 400 nm to 700 nm, which corresponds to the visible light region. Thus, from the standpoint of transmittance alone, it is preferable that the metal ratio is 50% or less. Furthermore, when the metal ratio is 30% or less, characteristics which are free of wavelength dependence are obtained. From the above, it is preferable that the metal ratio is 50% or less.

Note that, as has been described above with reference to FIG. 11 and FIG. 12, it is desirable that the metal wires have a pitch of 150 nm or less and that the metal ratio is greater than 30%. In order for the metal ratio to be greater than 30%, the metal width of the metal wires should be greater than 50 nm when the pitch of the metal wires is 150 nm, and the metal width of the metal wires should be greater than 30 nm when the pitch of the metal wires is 100 nm. As shown in FIG. 11, the transmittance and reflectance when the pitch is 100 nm are higher than those when the pitch is 150 nm. However, in practice, it is fairly difficult to form metal wires with a metal width of about 30 nm.

Moreover, by tentatively fixing the metal width of the metal wires at 50 nm so that they are relatively easy to be formed, a comparison will be made between when the pitch of the metal wires is 100 nm and when it is 150 nm. In this case, the reflectance when the metal wire pitch is 150 nm is substantially equal to the reflectance when the metal wire pitch is 100 nm, but the transmittance when the metal wire pitch is 150 nm is higher than that when the metal wire pitch is 100 nm. Therefore, in view of the difficulty of forming metal wires with a small width, it is preferable that the metal wire pitch is 150 nm rather than 100 nm.

Next, with reference to FIG. 13, metal thickness dependence will be described. FIG. 13(a) is a graph showing the metal thickness dependence of vertical reflectance with respect to wavelengths, and FIG. 13(b) shows the metal thickness dependence of parallel transmittance with respect to wavelengths. Herein, the pitch of the metal wires is 150 nm, and the metal ratio is 50%.

Also herein, Al (aluminum) is used as the material of the metal wires. Al is a metal whose reflectance is the highest next to silver (Ag), and has a flatter wavelength dependence with respect to visible light than does Ag, and is apt to maintain reflectance against aging (clouding). Therefore, Al is suitably used as the material of the metal wires.

As shown in FIG. 13(a), the vertical reflectance decreases as the metal thickness decreases. This is because light is partly transmitted through the wire grid when the metal thickness is thin. Moreover, the vertical reflectance is substantially equal when the metal thickness is 100 nm, 300 nm, or 500 nm. However, the vertical reflectance when the metal thickness is 50 nm is lower than the vertical reflectance when the metal thickness is 100 nm, 300 nm, or 500 nm. Therefore, it is preferable that the metal thickness is 100 nm or more.

When the metal thickness is varied between 50 nm, 100 nm, 300 nm, and 500 nm as shown in FIG. 13(b), the parallel transmittance is the highest when the metal thickness is 100 nm, and the parallel transmittance decreases whether the metal thickness is thinner or thicker than 100 nm, as will be understood from FIG. 13(b). Therefore, it is preferable that the metal thickness is substantially 100 nm (specifically, 80 nm to 120 nm).

From the above, it is preferable that the wire grid to be used in combination with the backlight has a high transmittance. Moreover, the metal ratio is preferably greater than 30%. From the standpoint of transmittance and reflectance, the pitch of the metal wires 124 in the wire grid 120 is 150 nm or less, but from the standpoint of processing, it is difficult to form metal wires with a pitch of 100 nm or less. Therefore, it is preferable to increase the transmittance by setting the pitch to 150 nm and increasing the metal ratio. Moreover, the thickness of the metal wires 124 is preferably 100 nm.

Although the converging film and the diffusing film are provided so as to be integral with the light guide plate in the above description, the present invention is not limited thereto. The converging film and the diffusing film do not need to be provided integrally with the light guide plate, and do not need to be constituent elements of the backlight 110. Moreover, the illuminator 100 does not need to have a converging film and a diffusing film.

Although the above-described liquid crystal display device 150 includes the first polarizer 212 having a high degree of polarization, the present invention is not limited thereto. Since polarized light is selected by the wire grid 120, the first polarizer 212 does not need to be provided.

Although the selective reflection polarizer 120 is provided so as to be integral with the backlight 110 in the above-described liquid crystal display device 150, the present invention is not limited thereto. The selective reflection polarizer 120 may be provided so as to be integral with the liquid crystal panel 200.

Although the liquid crystal display device is a transmission-type liquid crystal display device in the above description, the present invention is not limited thereto. It may be a transmission/reflection combination type liquid crystal display device.

The entire disclosure of Japanese Patent Application No. 2008-31941, on which the present application claims priority, is hereby incorporated by reference.

Industrial Applicability

An illuminator according to the present invention is thin and has an excellent thermal resistance, and is capable of realizing a high efficiency of light utilization. Such an illuminator is suitably used for a liquid crystal display device.

The invention claimed is:

1. An illuminator comprising:
a backlight for emitting light containing first and second polarization components having polarization directions which are orthogonal to each other; and
a selective reflection polarizer having a reflectance for the first polarization component which is higher than a transmittance for the first polarization component, and having a transmittance for the second polarization component which is higher than a reflectance for the second polarization component, wherein,
the selective reflection polarizer includes a transparent substrate and a plurality of metal wires arrayed on the transparent substrate; and
a ratio of a width of the metal wires to a pitch of the metal wires is greater than 30% and equal to or less than 42%, and the backlight has a reflectance of 0.6 or more.

2. The illuminator of claim 1, wherein the reflectance of the backlight is no more than 0.8.

3. The illuminator of claim 1, wherein the pitch of the metal wires is 200 nm or less.

4. The illuminator of claim 1, wherein the metal wires have a thickness of substantially 100 nm.

5. A liquid crystal display device comprising:
a liquid crystal panel;
a backlight for emitting light containing first and second polarization components having polarization directions which are orthogonal to each other; and
a selective reflection polarizer interposed between the liquid crystal panel and the backlight, the selective reflection polarizer having a reflectance for the first polarization component which is higher than a transmittance for the first polarization component, and having a transmittance for the second polarization component which is higher than a reflectance for the second polarization component, wherein,
the selective reflection polarizer includes a transparent substrate and a plurality of metal wires arrayed on the transparent substrate; and
a ratio of a width of the metal wires to a pitch of the metal wires is greater than 30% and equal to or less than 42%, and the backlight has a reflectance of 0.6 or more.

* * * * *